J. L. HELLEN.
METHOD OF PRODUCING WHEELS.
APPLICATION FILED DEC. 30, 1919.

1,423,109.

Patented July 18, 1922.

Inventor
J. L. Hellen,
By H. R. Kerslake
Attorney

UNITED STATES PATENT OFFICE.

JACOB LUDVIG HELLEN, OF KLOFTEN, NORWAY.

METHOD OF PRODUCING WHEELS.

1,423,109.  Specification of Letters Patent.  Patented July 18, 1922.

Application filed December 30, 1919. Serial No. 348,417.

*To all whom it may concern:*

Be it known that I, JACOB LUDVIG HELLEN, citizen of Norway, residing at Kloften, Norway, have invented certain new and useful Improvements in Methods of Producing Wheels, of which the following is a specification.

The present invention relates to the producing of iron wheels or other metal wheels. The essential feature of the invention is this that the wheel proper is built up from the least possible number of different parts. Moreover the wheel is thus built up and formed in its individual parts, that all sorts of screw connections or other fastening means are avoided which involve the fixing of holes and weakening of the felloe as well as the other parts. At the same time the mode of manufacturing is such, that the whole—after that the spokes of the wheel in the usual manner have been placed in a star-formation in the boss or nave—so to say by a single manipulation forms a wheel, with a radial pressure action between the felloe and the spokes, in the moment the felloe by mechanical means, that is by crimping or the like, is pressed, squeezed or driven together over the outer ends of the spokes.

The invention is illustrated in the accompanying drawing, in which.

—1— is the nave into which the spokes —2— are placed in a simple way in cylindrically or otherwise suitably formed holes. —3— is the felloe which is equipped with a number of sleeves or sockets —4— corresponding to the number of spokes, and these sockets are formed with grooves or cavities —5— intended to form seats for the corresponding formed — preferably spherical-shaped outer ends —6— of the spokes —2—.

Figure 2:
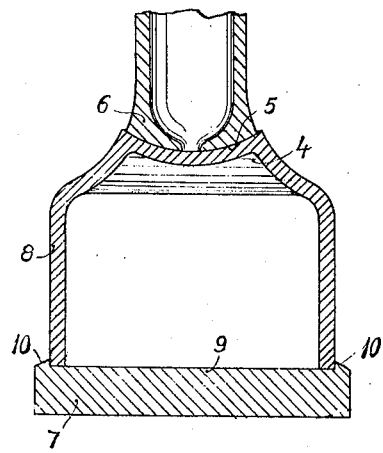
Figure 2 is a section through the place of connection between a spoke and the felloe.
Figure 3:
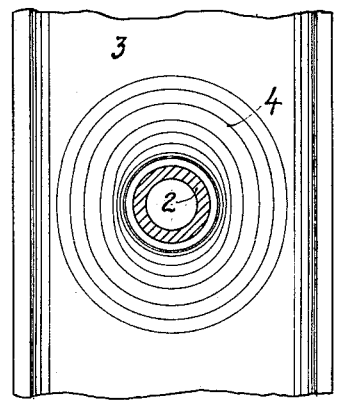
Figure 3 is a section through a spoke in the direction from the nave towards the felloe.

As will be seen the felloe in this way has no openings with subsequent weakenings, but is contrary to this shored up by the sockets —4— with cavities —5— shown specially in the Figures 2 and 3. The outer ends —6— of the spokes are commonly thickened by hammering or the like in the way shown in Figure 2, whereby a proportionally large and safe rest space or base against the cavities —5— of the felloe are formed from the material of the spoke itself.

The wheel is now produced in the said manner, by placing the spokes in the nave, whereupon the thus formed star-shaped wheel portion is surrounded by the felloe in a special machine suited for the purpose, so that the outer ends —6— of the spokes will correspond with the cavities —5— in the felloe, whereupon this by suitable means is drawn in towards the nave so that a radial action of pressure is established between the felloe, the spoke and the nave, which ensures an absolutely secure and rigid connection between all parts, whereby, in the same moment in which the radial contraction of the felloe is finished, the wheel is ready for use, as soon as the outer covering hoop —7— by crimping or otherwise is brought into place.

Figure 1:
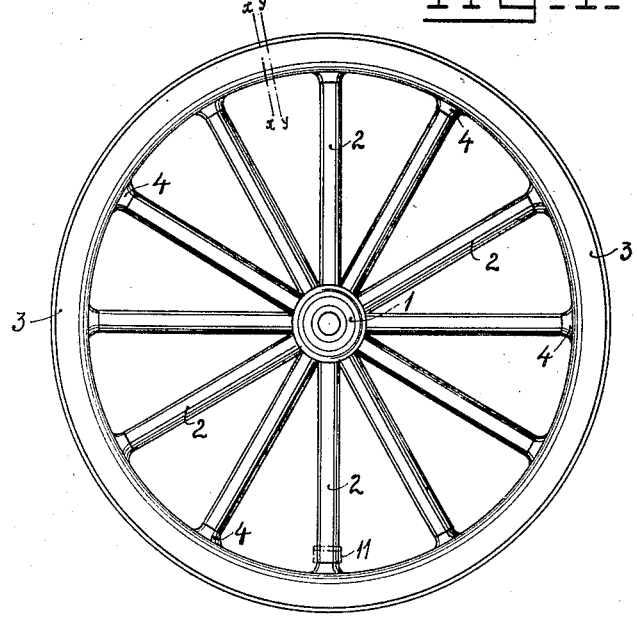
Figure 1 is a front view of the wheel.

The said contraction of the felloe which produces the radial action of pressure, is commonly effected in this way that the felloe is split up for instance in the place shown in Figure 1 in which the lines $x$—$x$ and $y$—$y$ denote the play between the free ends. By the in this way arising increase of the diameter and elasticity in peripheral direction, the felloe with its cavities —5— may easily be placed over the outer ends —6— of the spokes, and when the felloe is drawn together in the special machine by means of a cramping device or the like, the spoke ends will be brought into a secure and undetachable connection with the cavities of the felloe. The connection will be completed and the intended radial action of pressure will be established in the moment the ends of the felloe meet, whereupon the operation is brought to an end. After the ends of the felloe now have been welded together or united in another way the wheel will form a connected whole.

The radial contraction of the felloe may also be effected by crimping, whereby the felloe, without being split up, by means of heat is widened so much that the spokes which to a certain degree are yielding, may be pushed with their outer ends —6— into the cavities —5—, whereby the subsequent cooling of the felloe will produce the wanted radial action of pressure and connect the individual parts, the felloe, the spokes and the nave, securely.

As shown in Figure 2 the hoop —7— may comprise outer edges —10— which enclose the side edges of the felloe. By jumping or driving, the connection between the hoop and the felloe is made hermetically tight so that dirt and moisture cannot penetrate into the otherwise also fully tight wheel rim and form rust and destroy the wheel.

The dotted lines —11— in Figure 1 below denotes a screw-connection, which may be used at the reparation of the wheel so that an opening of the whole felloe is unnecessary when it is wanted to insert a single spoke.

Having now particularly described and ascertained the nature of my said invention and in what manner the same is to be performed, I declare that what I claim is:—

1. A method of constructing water-tight hollow metal wheels consisting in forming hollow metal spokes, thickening the outer ends of said spokes and providing the thickened ends with spherical end surfaces, forming a hub and placing the inner ends of said spokes in said hub, forming a metal ring into a felly of channel-shaped cross-section with the mouth opening outwardly, providing the bottom of the channel with integral spaced spherical seats corresponding to the number of spokes in the hub, placing the spherical ends of the spokes in engagement with the spherical seats, reducing the circumference of said felly to cause the same to grip the spokes, and placing a rim over the mouth of said channel.

2. A method of the kind defined by claim 1 in which the diameter of the felly is reduced by having the same in the form of a split ring and drawing its ends together after the spherical seats have been placed in engagement with the spherical ends of the spokes.

In testimony whereof I affix my signature.

JACOB LUDVIG HELLEN.

Witnesses:
AXEL LAHN,
THEODOR JESPUSEN.